United States Patent
Kilgariff (12)

(10) Patent No.: US 6,314,136 B1
(45) Date of Patent: *Nov. 6, 2001

(54) METHOD FOR PERFORMING WAVELET-BASED IMAGE COMPACTION LOSSLESSLY AND LOW BIT PRECISION REQUIREMENTS

(75) Inventor: Emmett Kilgariff, Sunnyvale, CA (US)

(73) Assignee: Creative Technology Ltd., Singapore (SG)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,229

(22) Filed: Aug. 1, 1997

(51) Int. Cl.$^7$ ........................................... H04B 1/66
(52) U.S. Cl. ..................... 375/240; 382/236; 382/221; 382/272; 382/162; 382/166
(58) Field of Search ..................... 348/403, 420, 348/421, 395, 396; 382/171, 173, 232; 375/240

(56) References Cited

U.S. PATENT DOCUMENTS

| | | | |
|---|---|---|---|
| 4,819,061 | * | 4/1989 | Lang ........................................ 358/31 |
| 5,146,324 | * | 9/1992 | Miller et al. ........................... 358/133 |
| 5,185,655 | * | 2/1993 | Wakeland ............................... 358/13 |
| 5,583,794 | * | 12/1996 | Shimizu et al. ....................... 382/243 |
| 5,737,447 | * | 4/1998 | Bourden et al. ...................... 382/236 |
| 5,745,186 | * | 4/1998 | Shimizu et al. ....................... 348/562 |
| 5,822,460 | * | 10/1998 | Kim ....................................... 382/243 |
| 5,861,960 | * | 1/1999 | Suzuki et al. .......................... 358/432 |
| 5,883,722 | * | 3/1999 | Baumler ................................ 358/296 |
| 6,031,937 | * | 2/2000 | Graffagnino .......................... 382/236 |

OTHER PUBLICATIONS

*Talisman: Questions and Answers for Technology Initiative*, Microsoft Web Site (www.microsoft.com), Jan. 1997.
*Texture and Rendering Engine Compression (TREC)*, Microsoft Web Site (www.microsoft.com), Jan. 1997.
*Talisman: Commodity Realtime 3D Graphics for the PC*, Microsoft Web Site (www.microsoft.com), Jan. 1997.
"Talisman: Questions and Answers for Technology Initiative" http://www.microsoft.com, Jan. 1997.
"Texture and Rendering Engine Compression (TREC)" http://www.microsoft.com, Jan. 1997.
"Talisman: Commodity Realtime 3D Graphics for the PC" http://www.microsoft.com, Jan. 1997.

\* cited by examiner

*Primary Examiner*—Chris Kelley
*Assistant Examiner*—Shawn An
(74) *Attorney, Agent, or Firm*—Blakely, Sokoloff, Taylor & Zafman LLP

(57) ABSTRACT

A system and method used to perform lossless wavelet-based image transformations. In one embodiment, the method used for these transformations and for bit precision reduction. First, at least a luminance value is produced for each row of pixels of a selected pixel block. Next, a determination is made as to whether a luminance value associated with a particular row of pixels of the selected pixel block is positive. Thereafter, a reduced luminance value is produced when the luminance value is determined to be positive, the reduced luminance value is represented by a lesser number of bits than the luminance value. Finally, the second and third steps are continued for each luminance value associated with each row of the selected pixel block. The values are used in an iterative fashion to calculate the low and high spatial frequency and create graphics with minimal use of bandwidth.

20 Claims, 9 Drawing Sheets

| Pixel Block | Coefficient | Value | Max Size (Bits) |
|---|---|---|---|
| 110 | C1 | $P_{00} + P_{01} + P_{10} + P_{11}$ | 10 |
|  | D1 | $P_{00} + P_{01} - P_{10} - P_{11}$ | 10 |
|  | D2 | $P_{00} - P_{01} + P_{10} - P_{11}$ | 10 |
|  | D3 | $P_{00} - P_{01} - P_{10} + P_{11}$ | 10 |

FIG. 1B
Prior Art

| Pixel Block | Coefficient | Value | Max Size (Bits) |
|---|---|---|---|
| 130 | $C1_{2d}$ | $C1 + C2 + C3 + C4$ | 12 |
|  | D13 | $C1 + C2 - C3 - C4$ | 12 |
|  | D14 | $C1 - C2 + C3 - C4$ | 12 |
|  | D15 | $C1 - C2 - C3 + C4$ | 12 |

FIG. 1C
Prior Art

METHOD FOR PERFORMING WAVELET-BASED IMAGE COMPACTION LOSSLESSLY AND LOW BIT PRECISION REQUIREMENTS

BACKGROUND OF THE INVENTION

1. Field of the Invention

The present invention relates to the field of graphics and image processors. More particularly, the present invention relates to a system and method for performing lossless wavelet-based image transformations with minimal bit precision.

2. Description of Related Art

Due to continuing advancements and use of digital imaging, systems are now experiencing difficulties in supporting the processing, transmission and storage of digital images in a cost-effective manner. For example, in order to display a non-compressed, color digital image on an archaic 640×480 pixel display screen, an enormous amount of data is required, approximately 921,600 bytes of storage when three (3) bytes are assigned for each pixel of the color digital image. Recently developed display screens are capable of displaying a 2000×2000 pixel image which would require about twelve (12) megabytes of storage. The amount of data required to transfer and store digital images, especially digital color images, is difficult to support and expensive to maintain. As a result, image compression, which reduces the amount of data required to represent a digital image, has become an integral part in the transmission and storage of digital images.

Typically, image compression is performed by an input image (e.g., a 640×480 color digital image) initially undergoes color space conversion. This involves converting Red, Green, Blue (RGB) information associated with each pixel of the input image into luminance and chrominance referred to as "YUV" values. Such conversion usually is usually performed on each pixel resulting in the conversion of successive blocks of pixels (individually referred to as a "pixel block") associated with the input image. These pixel blocks may be configured with any selected sizing (e.g., 8×8 pixel blocks).

For an 8×8 pixel block, each Y, U, and V value undergoes a compaction frequency transformation. This results in matrices of sixty-four (64) transmission coefficients including (a) a primary transmission coefficient and (b) sixty-three (63) secondary transmission coefficients for each of the Y, U and V values. The primary transmission coefficient (referred to herein as a "DC coefficient") constitutes the lowest spatial frequency associated with the pixel block. The secondary transmission coefficients (individually referred to as "AC coefficients") constitute higher spatial frequencies necessary to show degrees of contrast. Examples of compaction frequency transformations include a well-known Discrete Cosine Transform (DCT) and a wavelet-based image transformation.

Referring to FIGS. 1A–1C, an example of a conventional wavelet-based image transformation is described below. If supporting conversion of successive pixel blocks, each pixel block 100 (e.g., an 8×8 pixel block in this example) is sub-divided into sixteen 2×2 pixel blocks 110–125. For clarity sake, the operations performed by the conventional wavelet-based image transmission scheme will be discussed in reference to calculating the luminance (Y-value) for pixel block 100 starting with first pixel block 110. First pixel block 110 includes Y-values referred to as $P_{00}$, $P_{01}$, $P_{10}$ and $P_{11}$ in which each Y-value is a data byte (i.e., 8-bits) representing an unsigned number ranging in value from 0–255. The calculation of chrominance (U-values and V-values) may be performed in a similar manner, but these values would be represented as signed numbers ranging from −127 to 128.

First, $P_{00}$, $P_{01}$, $P_{10}$ and $P_{11}$ are added together to produce a preliminary DC coefficient (referred to as "C1") of first pixel block 110. The preliminary DC coefficient would require 10-bits of memory because 2-bit precision is required to support the addition of four (4) 8-bit values. In this example, three (3) first-level AC coefficients (referred to as D1–D3) of first block 110 are also produced as set forth in FIG. 1B. Each first-level AC coefficient requires 10-bits of memory. This process is continued for each of the other 2×2 pixel blocks 111–113 which, along with first pixel block 110, form a 4×4 pixel block 130. As a result, four (4) preliminary DC coefficients (C1–C4) and twelve (12) first-level AC coefficients (D1–D12) are produced, where preliminary DC coefficients (C2–C4) and their respective first-level AC coefficients D4–D12 are calculated in the same fashion as C1 and D1–D3 associated with first pixel block 110.

Next, preliminary DC coefficients (C1–C4) would be grouped together as a 2×2 pixel block to produce a DC coefficient of 4×4 pixel block 130 (referred to herein as a "second-level DC coefficient" $C1_{2d}$) and three (3) second-level AC coefficients (D13–D15) as shown in FIG. 1C. The memory space required to support each second-level DC coefficient and second-level AC coefficients would be 12-bits since 4-bit precision is necessary.

Thereafter, as an iterative process, other second-level DC coefficients each 4×4 pixel block 130–133 of 8×8 pixel block 100 are calculated, and thereafter, are grouped in order to produce a single DC coefficient being a maximum 14-bits in length (i.e., 6-bit precision) and sixty-three (63) AC coefficients including three (3) third-level AC coefficients being 14-bits in length, twelve (12) second-level AC coefficients being 12-bits in length, and forty-eight (48) first-level AC coefficients being 10-bits in length. The increasing bit size of the coefficients poses two disadvantages.

A first disadvantage is that this scheme of wavelet-based image transformation does not perform efficient compression. This is due to the fact that AC/DC coefficients representative of larger pixel blocks require extra bits, causing lower spatial frequency coefficients to contain more bits than necessary.

A second disadvantage is that if compression is performed in hardware, adder circuitry supporting larger and larger bit widths is needed for each iteration in calculating DC and AC coefficients. Alternatively, adders supporting a universal bit width may be implemented, provided this bit width supports the maximum bit precision needed. However, such an architecture would unnecessarily increase processing time and overall cost of the system.

Accordingly, there exists a need for a system and method for improving the performance of losses, memory-efficient wavelet-based image transformation caused by substantial reduction in bit precision requirements.

SUMMARY OF THE INVENTION

A system and method used to perform lossless wavelet-based image transformations. In one embodiment, the method utilizes a bit precision reduction technique during the compaction frequency transformation. The method features producing at least luminance value for each row of pixels of a selected pixel block. The selected pixel block is a portion of an image upon which graphics operations are to be performed. Next, at a minimum, a determination is made as to whether a luminance value associated with a particular row of pixels of the selected pixel block is positive. Thereafter, a reduced luminance value is produced when the luminance value is determined to be positive, the reduced luminance value is represented by a lesser number of bits than the luminance value. These operations are performed on each luminance value associated with each row of the selected pixel block. Of course, in combination with these operations, further operations may be performed on the chrominance values in an identical manner.

As a result, an iterative process may be established to produce multiple transmission coefficients representative of low and high spatial frequencies. These transmission coefficients are calculated with reduced bit width requirements by reducing bit size of coefficients used to calculate the primary transmission coefficients and secondary transmission coefficients of an image.

BRIEF DESCRIPTION OF THE DRAWINGS

The features and advantages of the present invention will become apparent from the following detailed description of the present invention in which:

FIGS. 1A–1C are block diagrams illustrating results of operations performed by a conventional wavelet-based image transformation scheme used to compress an 8×8 pixel block.

DESCRIPTION OF THE PREFERRED EMBODIMENT

The present invention describes a system and method for performing lossless compression using a wavelet-based image transformation with minimal bit precision. While certain illustrative embodiments are described below in order to convey the spirit and scope of the present invention, these embodiments should not be construed as a limitation on the scope of the present invention.

Moreover, various terms are used herein to describe certain structure or characteristics of the present invention. For example, "information" is broadly defined as data, and/or address, and/or control. A "communication line" is also broadly defined as any information-carrying medium (e.g., one or more electrical wires, bus traces, fiber optics, infrared or radio frequency signaling devices, etc.). A "module" includes a single integrated circuit (IC) device or multiple IC devices operating in combination with each other. These IC devices may be packaged within a single or multi-chip IC package, mounted on a common substrate such as a daughter card, or mounted on different substrates interconnected by a common substrate or a communication line.

Figure 1A:
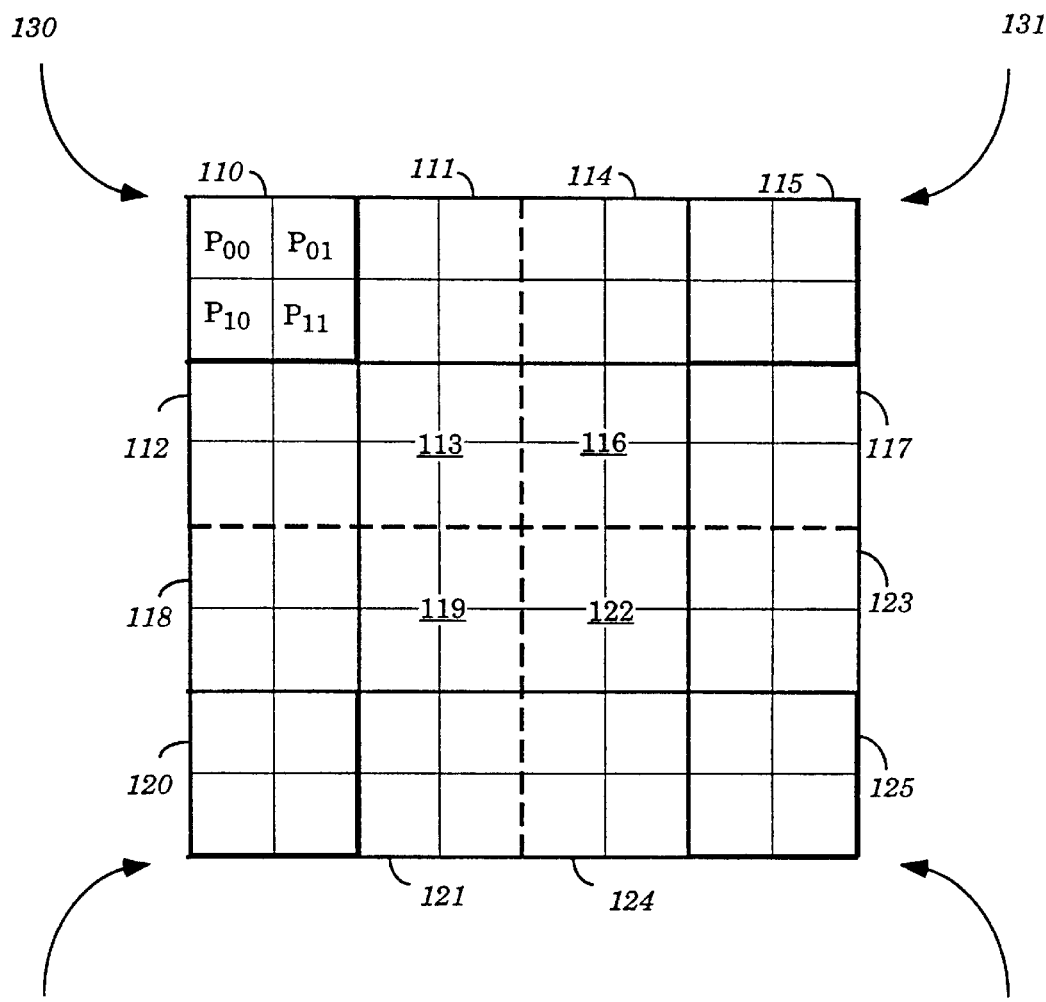
Figure 2:
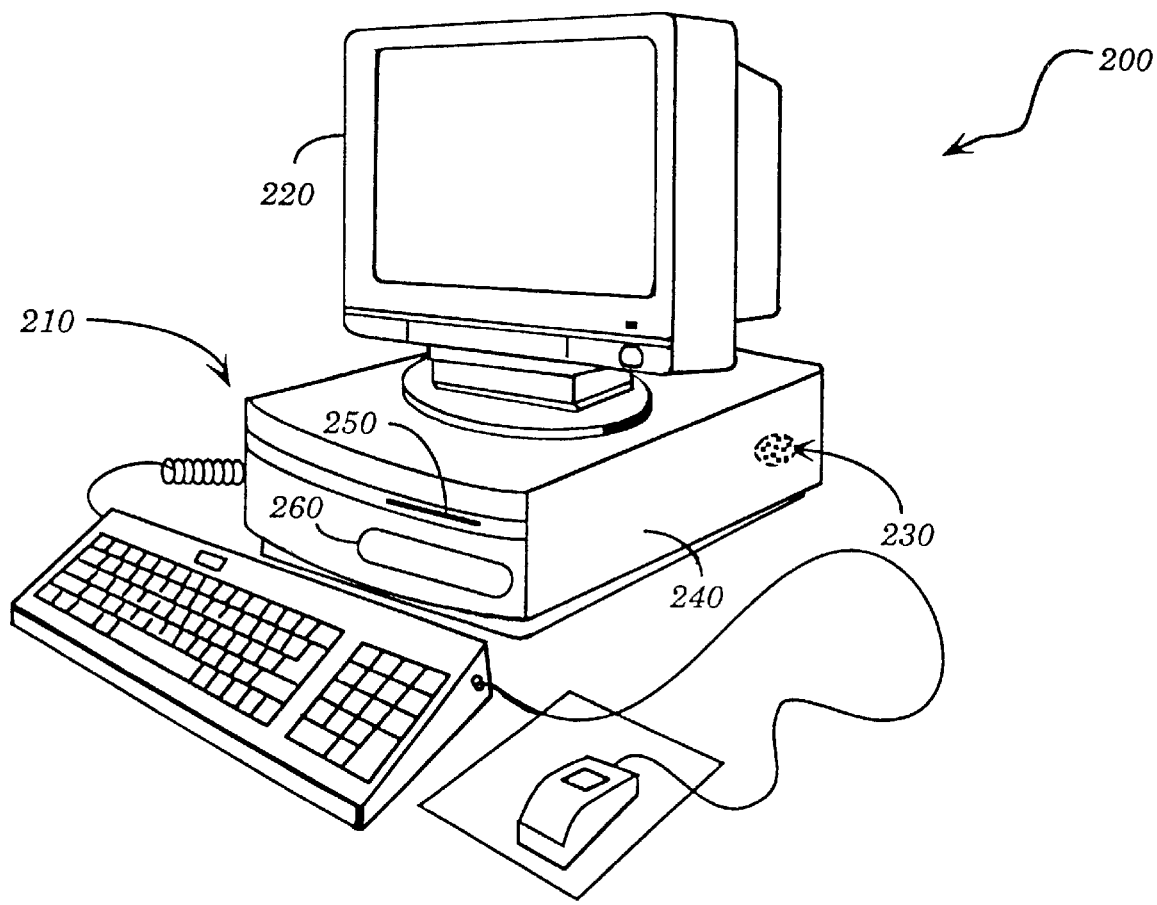
FIG. 2 is an illustrative embodiment of a system utilizing the present invention.

Referring now to FIG. 2, an embodiment of a system utilizing the present invention is shown. The system 200 features a computer 210 interconnected to a monitor 220. The type of monitor 220 may include, but is not limited or restricted to one of the following: a cathode ray tube (CRT) as shown, a flat panel display such as an active matrix or liquid crystal display. Likewise, computer 210 may include, but is not limited or restricted to one of the following: a desktop (as shown), a laptop or server.

Computer 210 includes one or more graphics modules (see FIG. 3) to receive digital information associated with an image to be displayed on monitor 220. Such digital information may be downloaded to graphics module(s) of computer 210 via an input port 230, normally protruding along a side of a casing 240 of computer 210. For example, input port 230 may include a serial communication port or a parallel port. Alternatively, the digital information associated with an image may reside within an internal hard disk drive of computer 210, a floppy disk 250 inserted into a floppy disk drive for subsequent loading into the graphics module(s) or a compact disk (CD) inserted in a CD-ROM drive 260.

Figure 3:
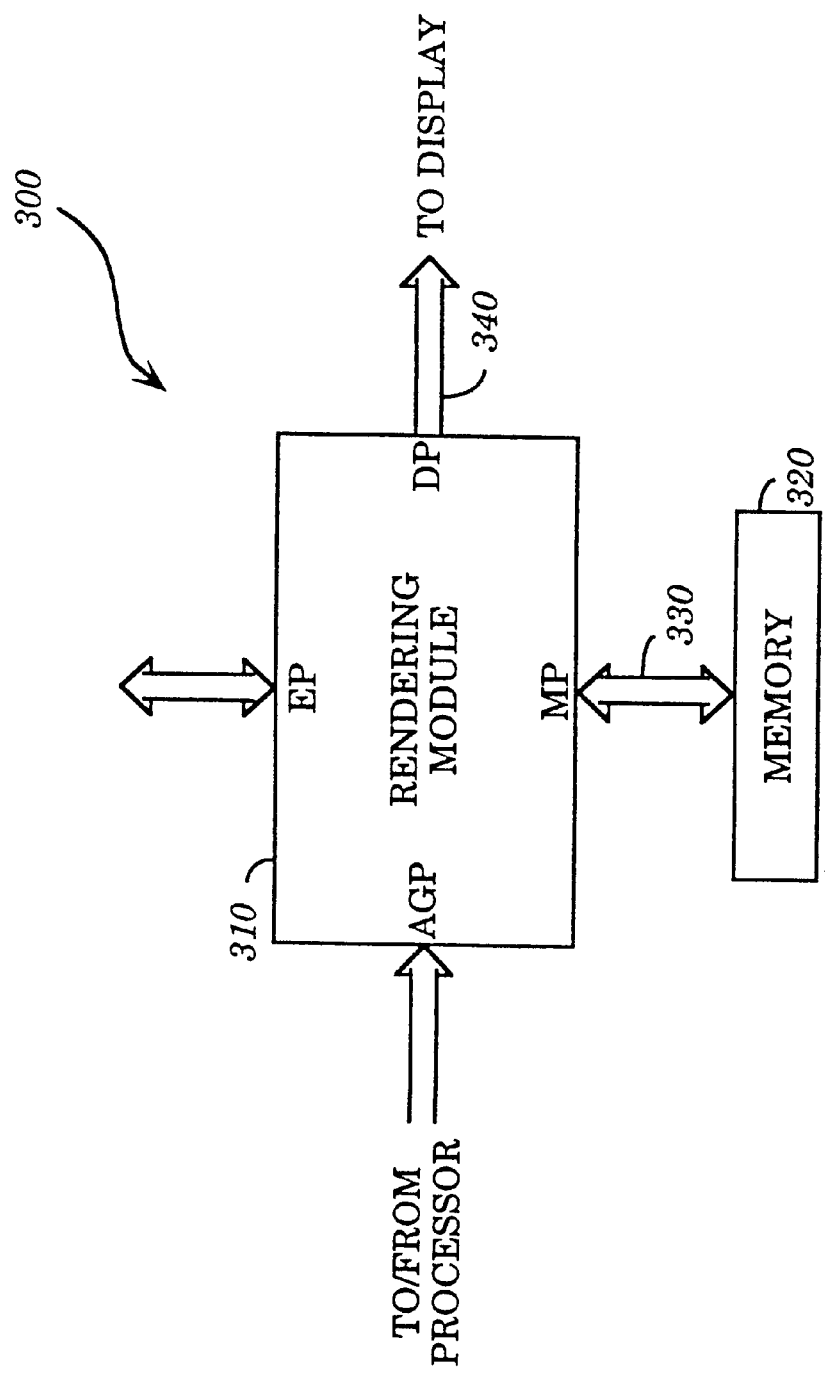
FIG. 3 is an illustrative embodiment of a graphics module implemented within the system of FIG. 2.

Referring now to FIG. 3, an embodiment of a graphics module implemented within computer 210 is shown. The graphics module 300 includes a rendering module 310 and a dedicated memory 320. Normally, memory 320 includes volatile memory such as Dynamic Random Access Memory (DRAM), although non-volatile memory may be used. Rendering module 310 includes a plurality of communication ports that enable data to be received or transmitted to a number of electronic devices. For example, as shown, rendering module 310 includes a memory port (MP) to support communications with dedicated memory 320 over communication line 330. Rendering module 310 further includes an Advanced Graphics Port (AGP) port to support communications with a processor (e.g., a microprocessor, microcontroller, or any other device having processing capability). Rendering module 310 further includes a display port (DP) which supports the transmission of pixel information to monitor 220 of FIG. 2 (not shown) over communication line 340, and an expansion port (EP) which supports communications with one or more other graphics modules.

Figure 4:
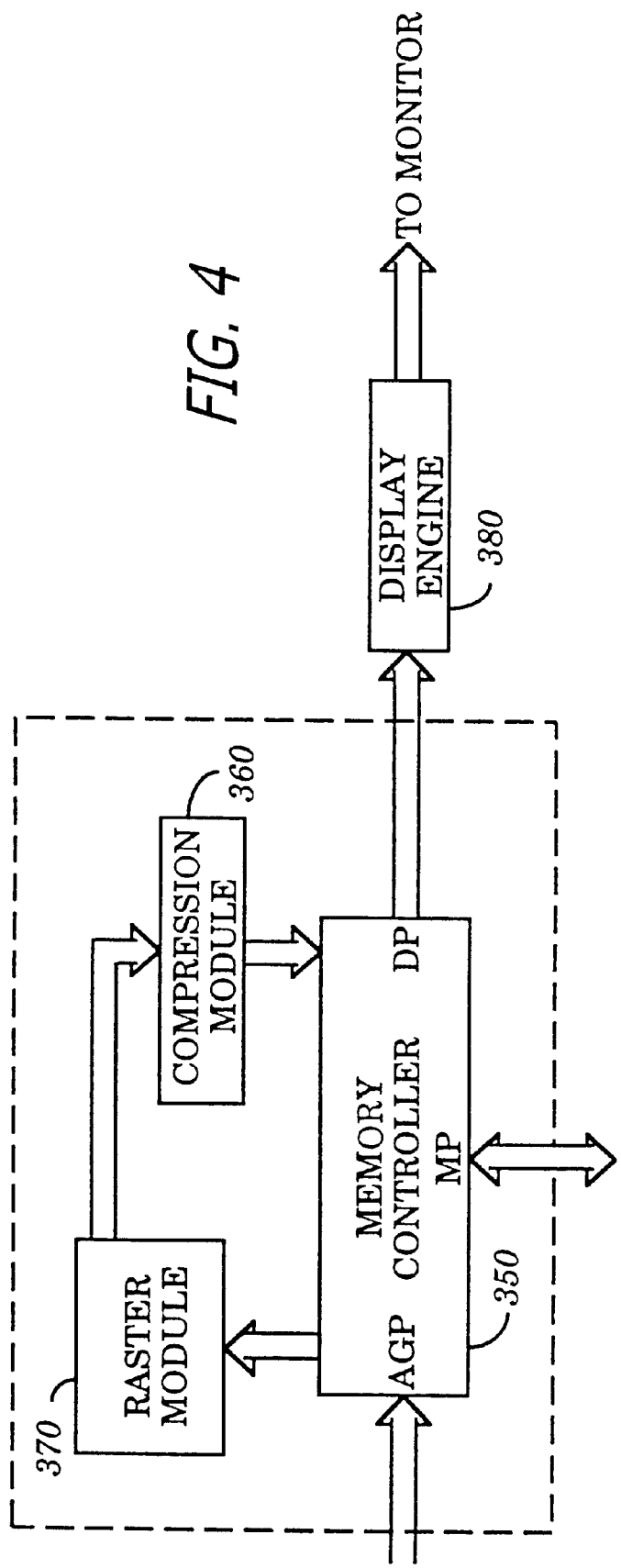
FIG. 4 is an illustrative embodiment of electronic circuitry implemented within a rendering module of the graphics module of FIG. 3.

Referring now to FIG. 4, rendering module 310 includes a memory controller 350, a compression module 360 and a raster module 370. Raster module 370 includes logic to perform raster operations as well as alpha blending and texture mappings on pixels forming at least a portion of the digital image (e.g., an 8×8 pixel block). Compression module 360 includes circuitry which performs color conversion, compaction frequency transformation and encoding operations on pixel values received from raster module 370. The compressed information is loaded into and contained in dedicated memory until requested by a display engine 380. Display engine 380 causes memory controller 350 to retrieve compressed information from memory. Thereafter, the compressed information is decompressed and transmitted to the monitor. Such transmission may occur in a digital format or converted into an analog format for direct transmission to the monitor.

Figure 5:
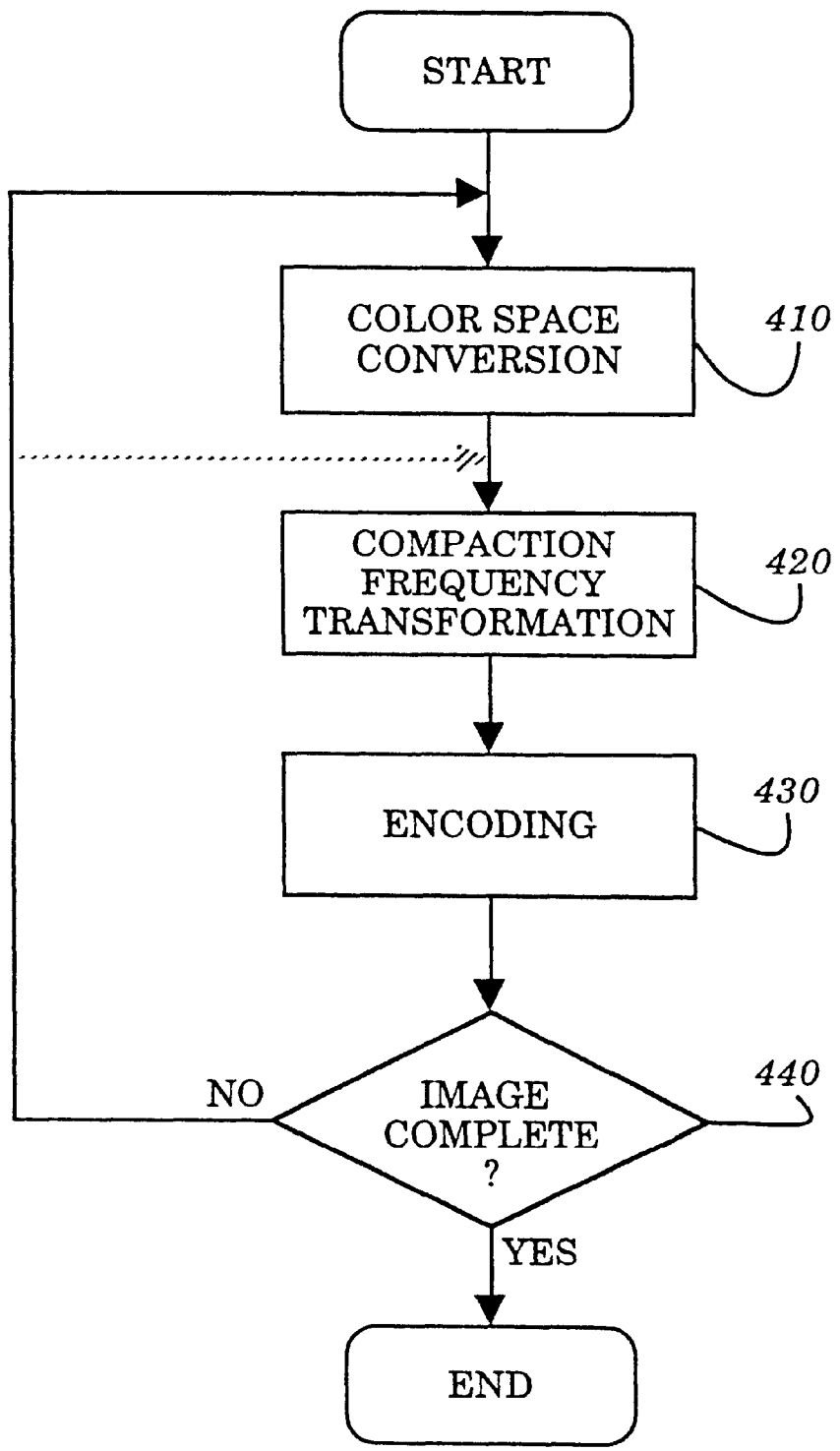
FIG. 5 is an illustrative flowchart of the operations performed by compression module implemented in the rendering module of FIG. 4.
Figure 6:
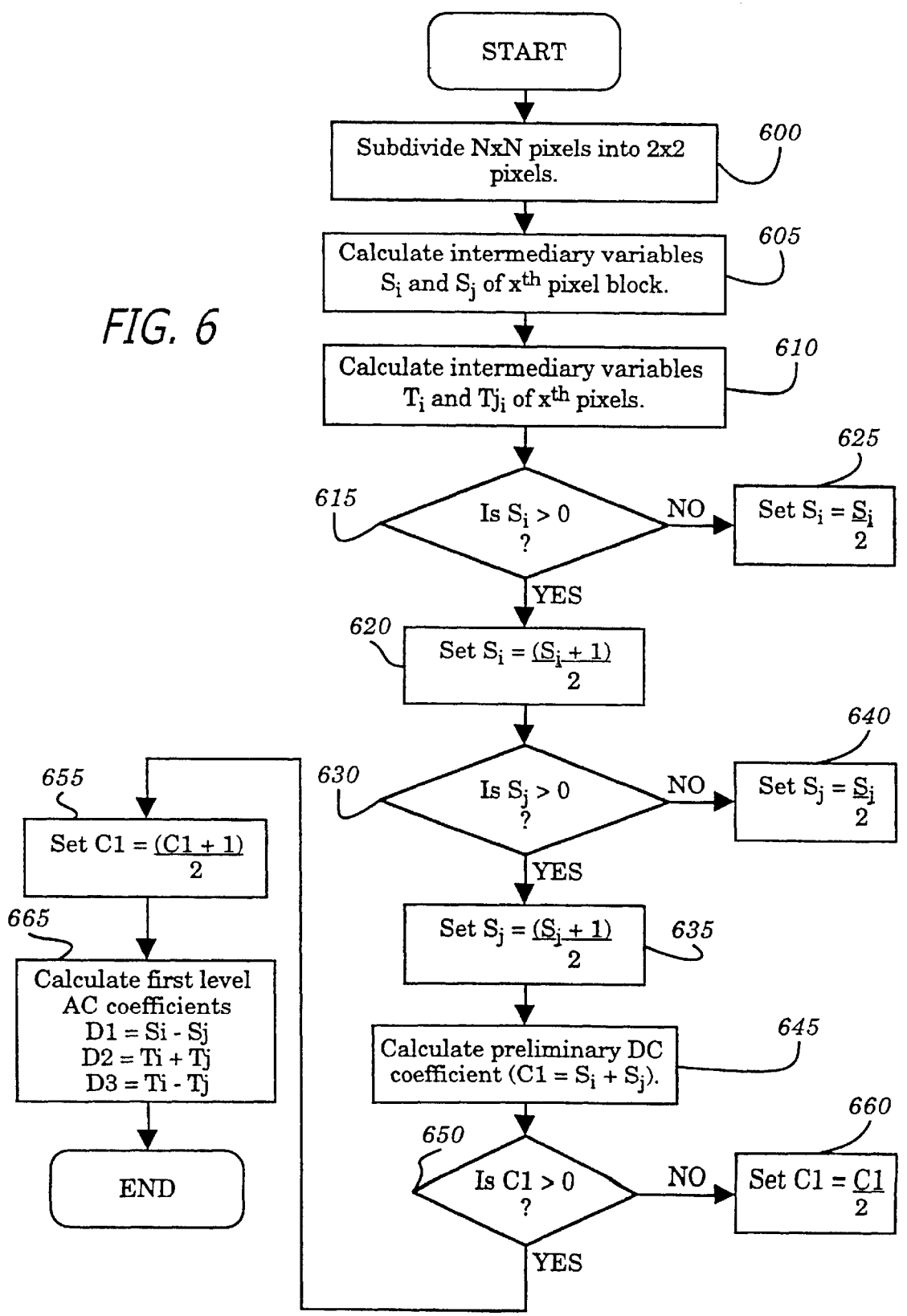
FIG. 6 is an illustrative flowchart of an iterative process used to calculate DC and AC coefficients of a pixel block which results in a minimal bit precision requirement.
Figure 7:
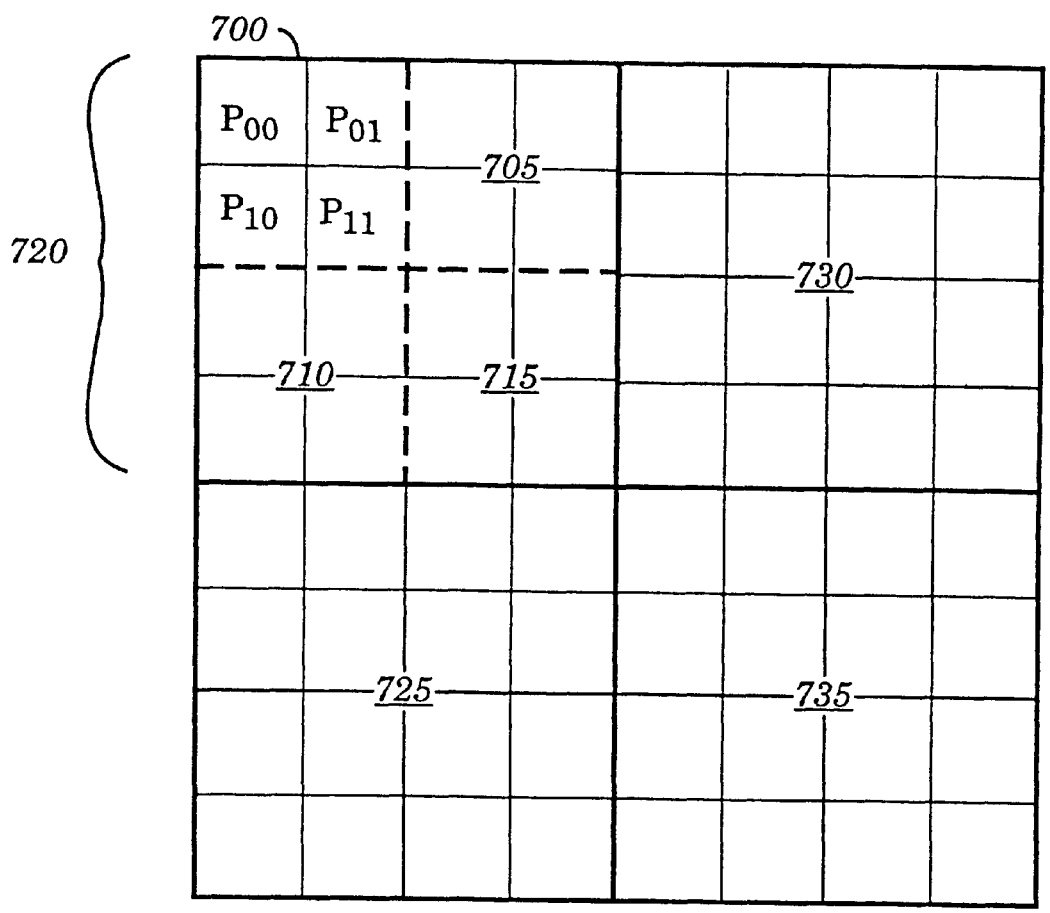
FIG. 7 is an illustrative block diagram describing the iterative process used to calculate DC and AC coefficients for larger pixel blocks.

Referring to FIGS. 5–7, illustrative flowcharts and an illustrative diagram featuring the operations performed by compression module 360 of FIG. 4 is shown. As shown in FIG. 5, a N×N pixel block initially undergoes color space conversion (Block 410) from Red, Green, Blue (RGB) values into luminance values (Y-values) and chrominance values (e.g., U/V-values). The YUV values support any communication standard including, but not limited or restricted to Phase Alternation Line (PAL) and National Television System Committee (NTSC). In this illustrative flowchart, "N" is a positive whole number arbitrarily chosen as eight. For the 8×8 pixel block, each Y-value, U-value, and V-value of the pixel block undergoes a compaction frequency transformation such as lossless wavelet-based image transformation as described in detail in FIGS. 6 and 7 (Block 420).

In this illustrative embodiment, each Y-value is represented as a single data byte representing an unsigned number ranging from 0–255. Moreover, each U-value and V-value is a single data byte representing a signed number ranging from –127 to 128. Of course, the size and format of these YUV values may be modified depending on design choice.

Referring now to FIGS. 6 and 7, during lossless wavelet-based image transmission, the N×N pixel block is subdivided into smaller M×M pixel blocks ("M" being a positive whole number, M<N) as shown in Block 600. To appreciate operational distinctions between the conventional lossless wavelet-based image transmission and the present invention, the transformation is initially performed on subdivided 2×2 pixel blocks (M=2) of an 8×8 pixel block (N=8). For clarity sake, these operations involve calculating luminance ("Y") values for the 8×pixel block of FIG. 7 in which the chrominance values may be calculated in a similar fashion. The first pixel block 700 includes Y-values referred to as $P_{00}$, $P_{01}$, $P_{10}$ and $P_{11}$. Each Y-value includes one data byte (i.e., 8-bits) and ranging in value from 0–255.

Referring to FIG. 6, in order to calculate the preliminary DC coefficient and the first-level AC coefficients, each row of Y-values for first pixel block are added together to produce a first variable "$S_i$" and a second variable "$S_j$" (Step 605). More specifically, the Y-values $P_{00}$ and $P_{01}$ are added together to produce variable $S_i$ and the Y-values $P_{10}$ and $P_{11}$ are added together to produce variable $S_j$. Similarly, the Y-values associated with each column of first pixel block 700 of FIG. 7 are subtracted from each other to produce a third variable "$T_i$" equivalent to $P_{00}$–$P_{10}$ and a second variable "$T_j$" equivalent to $P_{01}$–$P_{11}$ (Block 610).

Thereafter, a determination is made as to whether $S_i$ is a positive number (-Block 615). This determination may not be necessary for calculation of transmission coefficients associated with spatial frequencies (i.e., DC & AC coefficients) for Y-values having unsigned bit representations, but would be necessary for such calculations of the transmission coefficients associated with U-values and V-values represented in a signed bit format. If $S_i$ is positive, $S_i$ is set to a first reduced value (-Block 620). Otherwise, $S_i$ is set to a second reduced value (-Block 625). These reduced values are set forth below in pseudo-code of Table A and are used to reduce bit precision requirements.

TABLE A

If $((S_i = P_{00} + P_{01}) > 0)$, then $S_i = \frac{(S_i + 1)}{2}$ else $S_i = \frac{S_i}{2}$ Thereafter, a determination is made as to whether $S_j$ is positive (-Block 630). If so, $S_j$ is set to a third reduced value (-Block 635). Otherwise, $S_j$ is alternatively set to a fourth reduced value (-Block 640). These reduced values are set forth in pseudo-code of Table B and are used to eliminate the need for bit precision for the preliminary DC (primary transmission) coefficient of the first pixel block 700.

TABLE B

If $((S_j = P_{10} + P_{11}) > 0)$, then $S_j = \frac{(S_j + 1)}{2}$ else $S_j = \frac{S_j}{2}$ Next, the preliminary DC coefficient (C1) is calculated by taking the sum of $S_i$ and $S_j$ (-Block 645). If C1 is positive, C1 is set to a fifth reduced value (Blocks 650–655) equivalent to (C1+1)/2. Otherwise, C1 is set to a sixth reduced value (-Block 660). These reduced values are set forth below in pseudo-code of Table C and are used to reduce bit precision requirements.

TABLE C

If $((C1 = S_i + S_j) > 0$, then $C1 = \frac{(C1 + 1)}{2}$ else $C1 = \frac{C1}{2}$ The first-level AC coefficients (D1–D3) associated with preliminary DC coefficient (C1) are calculated based on the addition and subtraction of the variables ($S_i$, $S_j$, $T_i$, and $T_j$) as set forth in -Block 665. The values of D1–D3 are (a) D1=$S_i$–$S_j$; (b) D2=$T_i$+$T_j$; and (c) D3=$T_i$–$T_j$.

As a result, the preliminary DC coefficient (C1) is only 8-bits in length, and thus, would only require 8-bits of memory for storage and would support faster transmission of the data. The first-level AC coefficients (D1) would require 9-bits of memory while first-level AC coefficients (D2 and D3) would requires 10-bits of memory. Using the techniques identified above, this process is repeated by forming a 2×2 pixel block with preliminary DC coefficients of 2×2 pixel blocks to effectively form a 4×4 pixel block. This process is further repeated by combining second-level DC coefficients of 4×4 pixel blocks forming an 8×8 pixel block as described below.

Referring now to FIG. 7, the wavelet-based image compression scheme of the present invention is continued for each of the other 2×2 pixel blocks 705, 710 and 715 which, along with first pixel block 700, form 4×4 pixel block 720. As a result, four (4) preliminary DC coefficients (C1–C4) and twelve (12) first-level AC coefficients (D1–D12) would be produced, where preliminary DC coefficients (C2–C4) and their respective first-level AC coefficients D4–D12 associated with pixel blocks 705, 710 and 715 are calculated in the same fashion as C1 and D1–D3 associated with first pixel block 700.

Next, the preliminary DC coefficients (C1–C4) would be grouped together as a 2×2 pixel block to produce in accordance with the same procedure described above to produce a second-level DC coefficient and three (3) second-level AC coefficients associated with pixel block 720. The memory space required to support each second-level DC coefficients would be 8-bits of memory and the second-level AC coefficients would require 10-bits of memory.

Thereafter, as an iterative process, other second-level DC coefficients each 4×4 pixel block 720, 725, 730 and 735 of 8×8 pixel block 750 are calculated, and thereafter, are grouped in order to produce a single DC coefficient continuing to be 8-bits in length and sixty-three (63) AC coefficients. These coefficients include three (3) third-level AC coefficients, twelve (12) second-level AC coefficients and forty-eight (48) first-level AC coefficients, all of which being 10-bits in length. This technique would provide a memory size savings of 44 bits per 8×8 pixel block and over 211,000 bits for a display image produced on a 640×480 display monitor. Of course, this technique would provide greater pixel savings for lower spatial frequency coefficients if pixel blocks larger than 8×8 are utilized. Moreover, the bit width supported by adder circuitry is generally constant so that multiple sized adders would not be needed or single sized adders supports a substantial number of bits due to bit precision.

Referring back to FIG. 5, after the compaction frequency transformation has been performed, the DC and AC coefficients undergo variable run-length encoding such as Huffman encoding (-Block 430). This process is continued for successive blocks by performing RGB-to-YUV conversion on a successive pixel block or alternatively obtaining YUV values of the successive block which has already been converted (as shown by dotted lines) to produce the compressed digital image.

Figure 8:
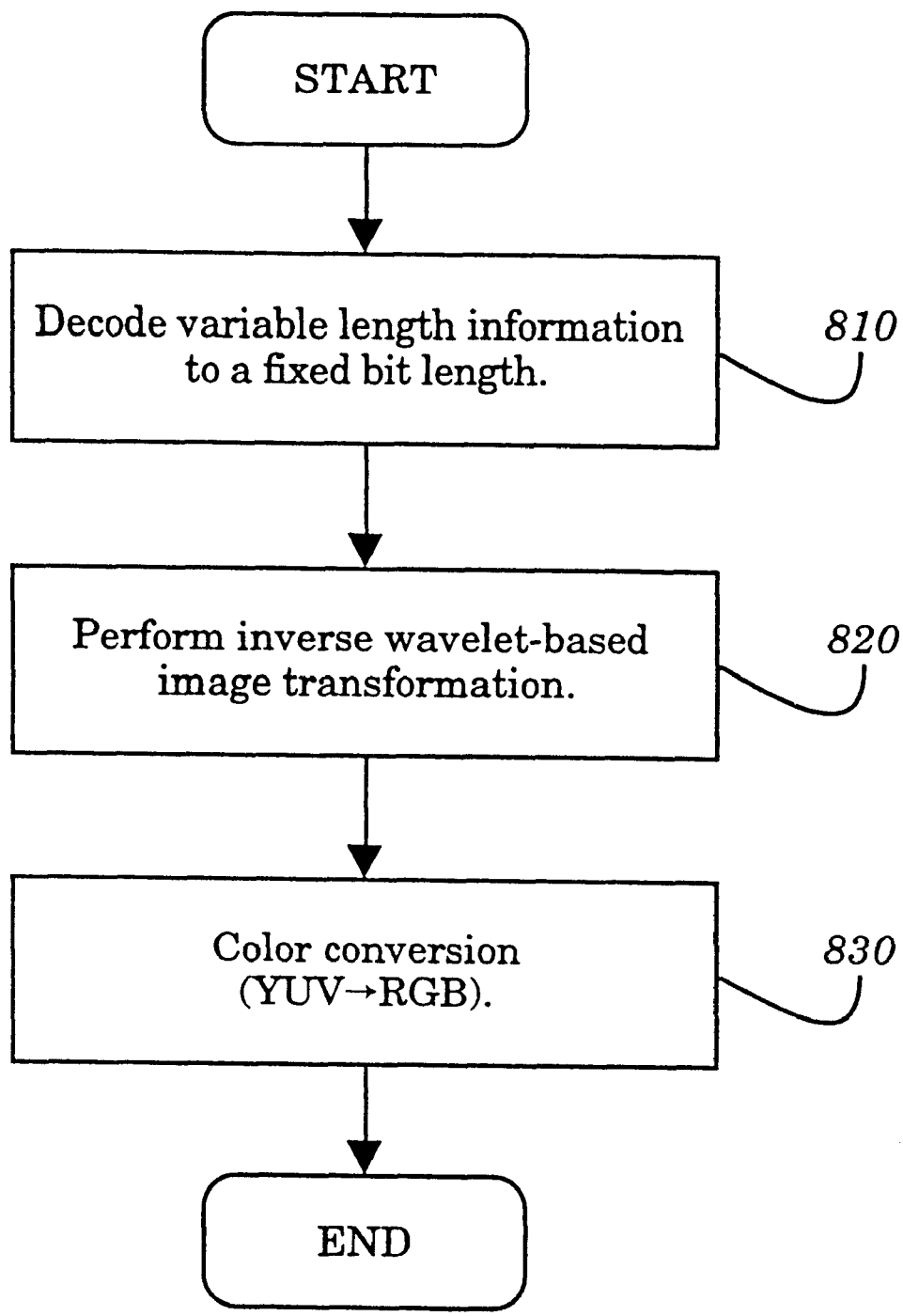
FIG. 8 is an illustrative embodiment of an inverse wavelet-based image transformation scheme utilizing the present invention.

Referring now to FIG. 8, during decompression, information having a variable bit length is decoded to produce decoded information of a fixed bit length (-Block 810). Next, an inverse wavelet-based image transformation is performed on the decoded information in order to translate DC and AC coefficients formed by wavelet-based image transformation into Y-values, U-values and V-values (-Block 820). This occurs by translating the preliminary DC coefficient (C1) and the first-level AC coefficients (D1–D3) into intermediary values (Q0–Q3) as set forth in Table D.

TABLE D

| Intermediary Value | |
|---|---|
| Q0 | $C1 + \dfrac{D1}{2}$ |
| Q1 | $C1 + \dfrac{(D1+1)}{2}$ |
| Q2 | $D2 + \dfrac{D3}{2}$ |
| Q3 | $D2 - \dfrac{(D3-1)}{2}$ |

Next, as shown in Table E, the Y-value is calculated from the intermediary values to restore the original data without data loss. The same operations are also performed to produce the U-values and V-values. Of course, the DC/AC coefficients will differ for these values.

TABLE E

| Y-Values | |
|---|---|
| P00 | $Q0 + \dfrac{Q2}{2}$ |
| P01 | $Q0 - \dfrac{(Q2+1)}{2}$ |
| P10 | $Q1 + \dfrac{Q3}{2}$ |

TABLE E-continued

| Y-Values | |
|---|---|
| P11 | $Q1 - \dfrac{(Q3+1)}{2}$ |

Next, color conversion is performed on the YUV-values to produce RGB values (-Block 830). Thus, decompression is active to restore the data back to its RGB format.

The present invention described herein may be designed in many different embodiments as evident to one skilled in the art than those described without departing from the spirit and scope of the present invention. The invention should, therefore be measured in terms of the claims which follow.

What is claimed is:

1. A method for bit precision reduction comprising:
   dividing a target image into a plurality of pixel blocks, each of the plurality of pixel blocks including a plurality of rows of pixels and a plurality of columns of pixels; and
   generating a reduced luminance value associated with a selected pixel block, the reduced luminance value being used to generate a reduced transmission coefficient for the selected pixel block, comprising:
      calculating a luminance value for each row of the selected pixel block;
      determining whether the calculated luminance value for each respective row is positive; and
      producing a reduced luminance value for the respective row if the corresponding calculated luminance value for the respective row, is detained to be positive, the reduced luminance value for the respective row is represented by a lesser number of bits than the corresponding calculated luminance value for the respective row.

2. The method of claim 1, wherein producing the reduced luminance value includes:
   incrementing the calculated luminance value associated with the respective row of pixels to produce a sum; and
   dividing the sum by two to produce the reduced luminance value.

3. The method of claim 1 further comprising:
   calculating a first transmission coefficient by adding the reduced luminance values associated with each row of pixels of the selected pixel block;
   determining whether the first transmission coefficient associated with the selected pixel block is positive;
   producing a first reduced transmission coefficient when the first transmission coefficient is determined to be positive, the first reduced transmission coefficient is represented by a lesser number of bits than the first transmission coefficient; and
   producing a second reduced transmission coefficient when the first transmission coefficient is non-positive.

4. The method of claim 3, wherein producing the first reduced transmission coefficient includes:
   incrementing the first transmission coefficient to produce a sum; and
   dividing the sum by two to produce the first reduced transmission coefficient.

5. The method of claim 3, wherein producing the second reduced transmission coefficient includes solely dividing the first transmission coefficient by two to produce the second reduced transmission coefficient.

6. The method of claim 3 further comprising calculating a plurality of second transmission coefficients associated with the selected pixel block based on the reduced luminance values.

7. The method of claim 1 further comprising:
producing a first reduced chrominance value (U-value) associated with the selected pixel block, comprising:
calculating a U-value for each row of pixels of the selected pixel block;
determining whether calculated U-value associated with each respective row of pixels of the selected pixel block is positive;
producing the first reduced U-value for the respective row when the corresponding calculated U-value is determined to be positive, the first reduced U-value is represented by a lesser number of bits than the corresponding calculated U-value.

8. The method of claim 7 further comprising:
producing a second reduced chrominance value (V-value) associated with the selected pixel block, comprising:
calculating a V-value for each row of pixels of the selected pixel block;
determining whether the calculated V-value associated with each respective row of pixels of the selected pixel block is positive;
producing the second reduced V-value for the respective row when the corresponding calculated V-value associated with the respective row of pixels is determined to be positive, the second reduced V-value is represented by a lesser number of bits than the corresponding calculated V-value.

9. The method of claim 8 further comprising:
calculating a first transmission coefficient by adding the reduced luminance values associated with each row of pixels of the selected pixel block;
determining whether the first transmission coefficient associated with the selected pixel block is positive; and
producing a first reduced transmission coefficient when the first transmission coefficient is determined to be positive, the first reduced transmission coefficient is represented by a lesser number of bits than the first transmission coefficient.

10. The method of claim 9, wherein producing the first reduced transmission coefficient includes:
incrementing the first transmission coefficient to produce a sum; and
dividing the sum by two to produce the first reduced transmission coefficient.

11. The method of claim 9 further comprising:
forming a pixel block associated with a plurality of transmission components including the first transmission component;
calculating a secondary transmission coefficient by adding the plurality of transmission components in accordance with each row of pixels of the pixel block;
determining whether the secondary transmission coefficient is positive;
producing a first reduced secondary transmission coefficient when the secondary transmission coefficient is determined to be positive, the first reduced secondary transmission coefficient is represented by a lesser number of bits than the secondary transmission coefficient; and
producing a second reduced secondary transmission coefficient when the secondary transmission coefficient is non-positive.

12. The method of claim 9 further comprising:
calculating a second transmission coefficient by adding the reduced U-values associated with each row of pixels of the selected pixel block;
determining whether the second transmission coefficient associated with the selected pixel block is positive; and
producing a second reduced transmission coefficient when the second transmission coefficient is determined to be positive, the second reduced transmission coefficient is represented by a lesser number of bits than the second transmission coefficient.

13. The method of claim 12 further comprising:
calculating a third transmission coefficient by adding the reduced V-values associated with each row of pixels of the selected pixel block;
determining whether the third transmission coefficient associated with the selected pixel block is positive; and
producing a third reduced transmission coefficient when the third transmission coefficient is determined to be positive, the third reduced transmission coefficient is represented by a lesser number of bits than the third transmission coefficient.

14. A method for bit precision reduction comprising:
partitioning a target image into a plurality of pixel blocks, each of the plurality of pixel blocks including at least two rows of pixels and at least two columns of pixels;
calculating luminance and chrominanice values for each row of pixels of a selected pixel block;
determining whether a luminance value associated with each respective row of pixels of the selected pixel block is positive;
producing a reduced luminance value for the respective row when the corresponding luminance value associated with the respective row of pixels is determined to be positive, the reduced luminance value for the respective row is represented by a lesser number of bits than the corresponding luminance value;
determining whether the chrominance values associated with each respective row of pixels is positive;
producing at least one reduced chrominance value for the respective row when the corresponding chrominance value associated with the respective row of pixels is determined to be positive, the reduced chrominance value is represented by a lesser number of bits than the corresponding chrominance value.

15. A graphics module comprising:
a raster module; and
a compression module coupled to the raster module, the compression module capable of performing iterative bit precision reduction calculations during a compaction frequency transformation when calculating a low-frequency transmission coefficient of an image, each bit precision reduction calculation including:
partitioning the image into a plurality of pixel blocks, each of the plurality of pixel blocks including a plurality of rows of pixel and a plurality of columns of pixels;
generating a reduced luminance value associated with a selected pixel block, the reduced luminance value being used to generate a reduced transmission coefficient for the selected pixel block, comprising:
calculating a luminance value for each row of the selected pixel block;
determining whether the calculated luminance value for each respective row is positive; and producing a reduced luminance value for the respective row if the corresponding calculated luminance value for the respective row is determined to be positive, the reduced luminance value for the respective row is represented by a lesser number of bits than the corresponding calculated luminance value for the respective row.

16. The graphic module of claim 15, wherein the compression module further continues determination and production operations for each luminance value associated with each row of pixels of the selected pixel block.

17. The graphic module of claim 15, wherein the compression module produces the reduced luminance values by incrementing the corresponding luminance value associated with the respective row of pixels to produce a sum, and dividing the sum by two.

18. The graphic module of claim 15, wherein the compression module further calculates a first transmission coefficient associated with luminance by adding the reduced luminance values associated with each row of pixels of the selected pixel block, determines whether the first transmission coefficient for the selected pixel block is positive, produces a first reduced transmission coefficient when the first transmission coefficient is determined to be positive in which the first reduced transmission coefficient is represented by a lesser number of bits than the first transmission coefficient, and produces a second reduced transmission coefficient when the first transmission coefficient is non-positive.

19. The graphics module of claim 18, wherein the compression module produces the first reduced transmission coefficient by incrementing the first transmission coefficient to produce a sum, and dividing the sum by two.

20. The graphics module of claim 18, wherein the compression module produces the second reduced transmission coefficient by dividing the first transmission coefficient by two.

* * * * *